United States Patent Office 3,490,308
Patented Jan. 20, 1970

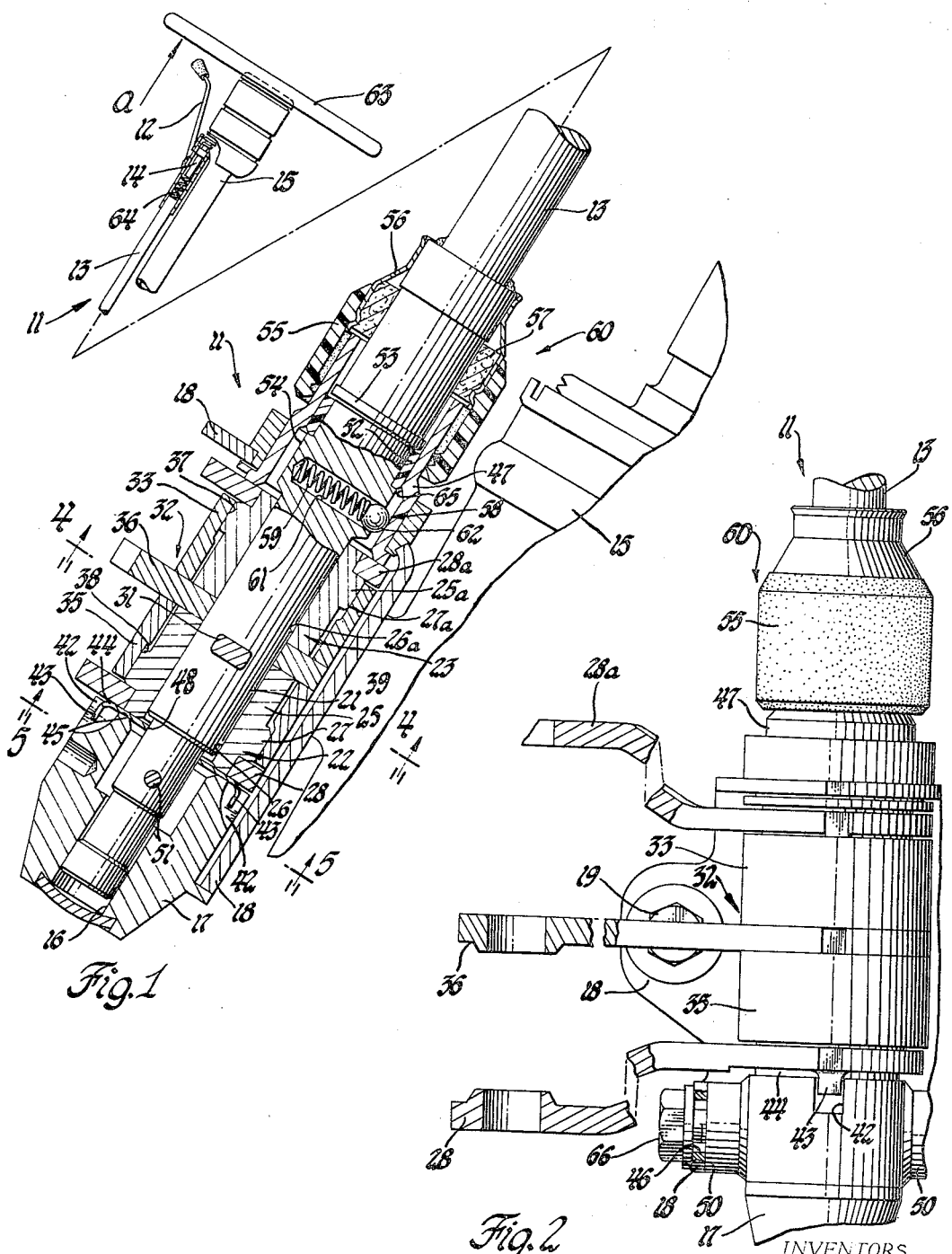

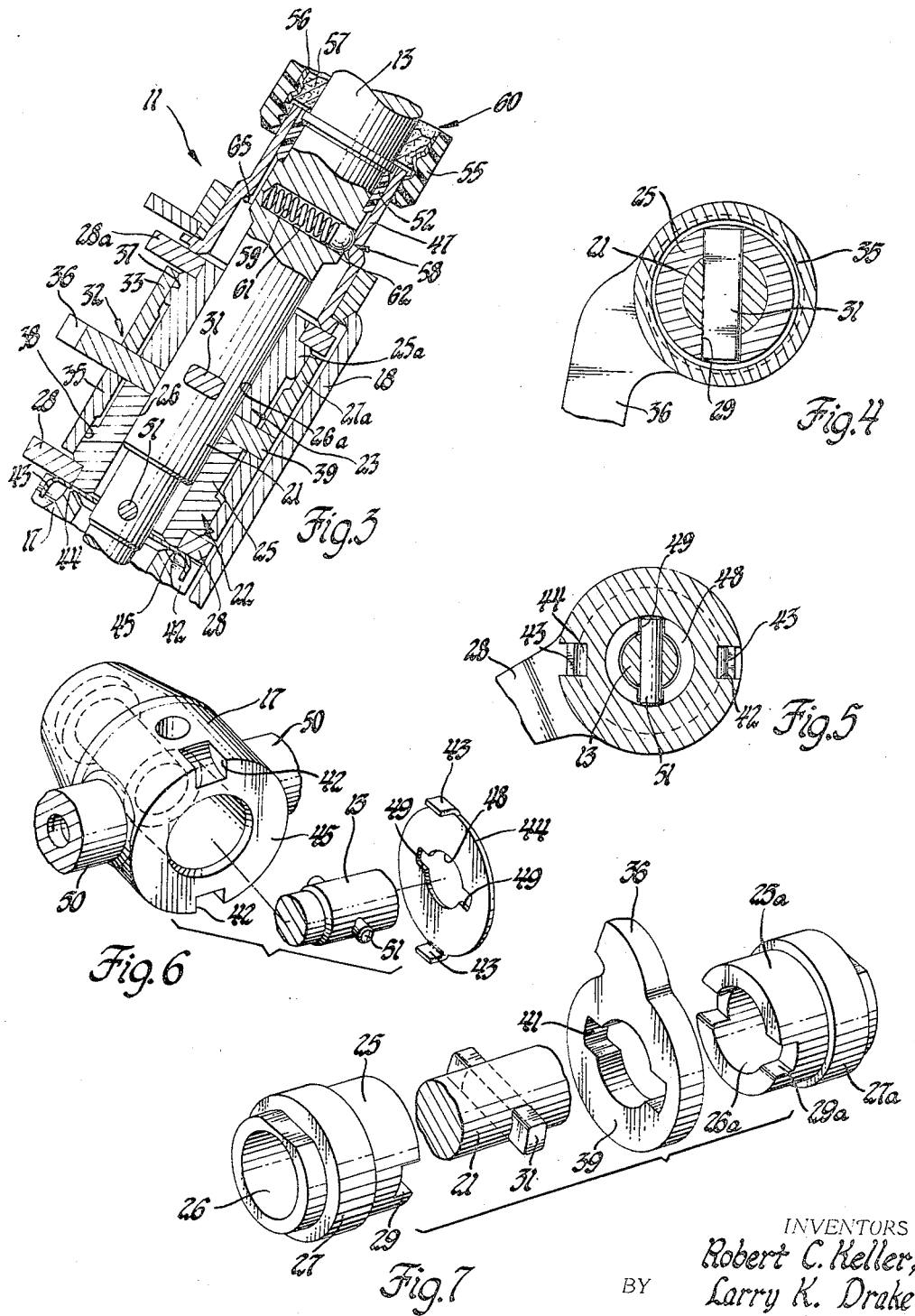

3,490,308
COLUMN-MOUNTED TRANSMISSION
CONTROL MECHANISM
Robert C. Keller and Larry K. Drake, Troy, Mich., assignors to General Motors Corporation, Detroit, Mich., a corporation of Delaware
Filed June 6, 1968, Ser. No. 734,970
Int. Cl. G05g 11/00
U.S. Cl. 74—484                                  8 Claims

ABSTRACT OF THE DISCLOSURE

A shift control mechanism in which the control shaft rotatably supports two bearing members and shift levers while a third bearing member and shift lever is rotatably and axially supported by the two aforementioned bearing members. The concentric arrangement of the bearing members provides widely spaced bearing surfaces to support the third bearing member. Reverse lockout structure, comprised of a movable pin and a stationary washer, is also provided in the control mechanism to prevent simultaneous engagement of a forward and reverse drive.

---

This invention relates to column-mounted transmission shift controls and more particularly to an improved bearing and support structure for such controls.

In column-mounted transmission controls, a manually controlled shift shaft is employed to selectively move a plurality of shift levers, which are operatively connected to the transmission by linkages, to establish various drive ratios. The shift levers are capable of rotating with or remaining stationary relative to the shift shaft. This invention provides shift lever bearings having increased bearing length to reduce the bearing loads in a more compact arrangement. In a shift control having three levers, the concentric bearing arrangement provides improved sealing and increased bearing length in a compact unit.

It is therefore an object of this invention to provide in a transmission control first bearing and shift lever means providing rotatable and axial support for second bearing and shift lever means.

It is another object of this invention to provide substantial bearing length for two members on the shift shaft and widely spaced bearing surfaces on said two members for rotatably supporting a third member.

Another object of this invention is to provide two shift levers rotatably supported on the control shaft and a third shift lever rotatably and axially supported on the two above-mentioned shift levers.

Another object of this invention is to provide a reverse lockout structure to prevent simultaneous engagement of a forward and reverse drive.

These and other objects of the invention will be more apparent from the following description and drawings of a preferred embodiment of the invention.

FIGURE 1 is an elevational view, partly in section, showing the bearing arrangement of the shift control.

FIGURE 2 is a side elevational view of the shift mechanism.

FIGURE 3 is a cross-sectional elevational view showing the shift rod in another position.

FIGURE 4 is a sectional view taken along line 4—4 of FIGURE 1.

FIGURE 5 is a sectional view taken along line 5—5 of FIGURE 1.

FIGURE 6 is an exploded perspective view of the reverse lockout mechanism.

FIGURE 7 is an exploded perspective view of a portion of the shift mechanism.

Referring to the drawings, there is shown in FIGURE 1, a shift control mechanism generally designated 11 which includes a manual lever 12 secured to a control shaft, the upper end of which is slidably supported on a pin 14 which is secured to a steering column 15. The lower end of the control shaft 13 is slidably supported in a bore 16 of a guide member 17 which is secured to a bracket 18 mounted on the lower end of the steering column 15 or a stationary frame member by fasteners 19. The control shaft 13 has a cylindrical portion 21 adjacent its lower end which is surrounded by a 3-4 bearing and shift lever assembly 22 and a reverse bearing and shift lever assembly 23. The 3-4 bearing and shift lever assembly includes a bearing member 25 having an inner bearing surface 26 circumjacent and rotatably supported by the control shaft 13 and an outer bearing surface 27, and a 3-4 shift lever 28 secured to the bearing member 25 by welding or other suitable method. The bearing member 25 also has a radially extending slot 29 which is selectively engageable by a key 31 which is carried by the cylindrical portion 21 of the control shaft 13. The reverse bearing assembly 23 is identical in construction to the 3-4 bearing assembly so that the corresponding parts are given the same numerical designation with an "a" suffix.

A 1-2 bearing and shift lever assembly, designated 32, surrounds the 3-4 bearing assembly 22 and the reverse bearing assembly 23 and is rotatably and axially supported thereby. The 1-2 bearing and shift assembly 32 includes an upper bearing member 33, a lower bearing number 35 and a 1-2 shift lever 36 secured between the upper and lower bearing members 33 and 35 by welding or other suitable process. The upper and lower bearing members 33 and 35 have bearing surfaces 37 and 38, circumjacent and rotatably supported by bearing surfaces 27 and 27a, respectively, which are widely spaced to reduce the bearing loads. The 1-2 shift lever 36 has an annular bearing surface 39 which abuts the upper and lower surfaces of bearing members 25 and 25a respectively. The 1-2 shift lever also has a slot 41 selectively engageable by the key 31 and aligned with the slots 29 and 29a when the transmission control is in neutral. In the preferred embodiment, the bearing members 33 and 35 are concentric with the bearing surfaces 27 and 27a, respectively, which in turn are concentric with the cylindrical portion 21 of the control shaft 13.

The guide member 17 is generally cylindrical in shape and has two axial slots 42 at its outer periphery which are adapted to receive tang members 43 of a lockout washer 44. The tangs 43 and slots 42 cooperate to prevent relative rotation between the guide member 17 and the lockout washer 44. The lockout washer 44 abuts the upper surface 45 of the guide member 17 and the lower surface of the 3-4 bearing and shift lever assembly 22. To maintain the axial alignment of the bearing and shift lever assemblies 22, 23 and 32, an elongated slot 46 is provided in the bracket 18 which permits the guide assembly 17 and lockout washer 44 to be moved upward and downward relative to the control shaft 13 such that during assembly, the guide 17 and lockout washer 44 urge the bearing assemblies 22, 23 and 32 upward until the upper surface of reverse bearing and shift lever assembly 23 abuts a bushing member 47 which is limited in its upward travel by the bracket 18. When the axial alignment is fixed thereby, a plurality of fasteners 66 are threaded into boss portions 50, of the guide member 17 and are tightened to secure the guide member 17 to the bracket 18 so that the axial alignment will be maintained. The control shaft 13 extends through a central opening 48 in the lockout washer 44. The lockout washer 44 also has two radial slots 49 which extend outwardly from the central opening 48 to permit a pin 51, secured to the control shaft 13, to pass through the washer 44 when the transmission control is in neutral, but to prevent the pin from passing through the washer when the control is in some position other than neutral.

The bushing 47 slidably supports a bearing 52 which is mounted on the control shaft 13 between two shoulder portions 53 and 54. The bushing 47 also provides a sealing surface for a dust cover assembly 60 which is comprised of a flexible seal 55 which contacts the bushing 47, a retainer 56 to which the seal 55 is bonded, and a seal member 57 compressed between the retainer 56 and the control shaft 13. The retainer 56, due to its resilient property, prevents relative motion between the dust cover assembly 60 and the control shaft 13. A conventional ball-detent mechanism 58, which includes a compression spring 59 disposed in a radial bore 61 of the shoulder 54 on the control shaft 13, and a ball 62 which is urged outwardly against the inner surface of the bushing 47 by the spring 59, provides a reverse "feel," as described below, for the operator.

The transmission control, as shown in FIGURE 1, is in the neutral position with the key 31 engaging the slot 29 so that rotation of the manual lever 12 in a plane parallel to the steering wheel 63 will cause rotation of the 3–4 shift lever 28 thereby engaging either the third or fourth drive ratio of the transmission. To shift the transmission to either first or second drive ratio, the manual lever 12 is moved upward toward the steering wheel 63 in the direction of arrow A against a spring 64 between the control shaft 13 and the pin 14 thereby raising the control shaft 13 until the key 31 engages the slot 41 of the 1–2 shift lever 36. Then upon rotation of the manual lever 12, the shift lever 36 will be rotated to establish either the first or second drive ratio in the transmission. To shift the transmission to reverse drive ratio, the manual lever 12 is moved further upward, in the direction of arrow A, toward the steering wheel 63 so that pin 51 passes through slot 49 and key 31 engages slot 29a. At the same time, the ball 62 contacts a ramp 65 on the bushing 47 thereby requiring the operator to exert additional upward force on the manual lever 12, due to the ball detent spring load, thus providing the reverse shift "feel." When the pin 51 is immediately below the lockout washer 44, the key 31 is engaging the slot 41, when the pin 51 is immediately above the lockout washer 44, as shown in FIGURE 3, the key 31 is engaging the slot 29a, and when the pin 51 is engaged in the slot 49, the manual control lever 12 cannot be rotated since the lockout washer is grounded through the guide 17 and the bracket 18. Thus, lockout washer 44 and the pin 51 prevent the operator from rotating the manual lever 12 when the key 31 is simultaneously engaging slot 41 of the 1–2 shift lever 36 and slot 29a of the reverse bearing and lever assembly 23.

Obviously, many modifications are possible in view of the above teachings, it is therefore to be understood that the invention may be practiced otherwise than as specifically described.

What is claimed is:

1. In a transmission shift control; support means; shift actuator means mounted in said support means for rotatable and axial movement; a first shift lever including first bearing means having a longer axial length than said shift lever and rotatably mounted circumjacent said shift actuator means; a second shift lever including second bearing means rotatably supported only by said first bearing means; said first and second bearing means engaging each other and said support means to axially locate both said bearing means on said support means; and shift means, carried by said first and second bearing means and said shift actuator means, for selectively interconnecting said shift actuator means to said first bearing means and said second bearing means when said shift actuator means is moved axially, and selectively rotating said first bearing means and said second bearing means when said shift actuator means is rotated.

2. The invention defined in claim 1 and said first bearing means having an axial bearing portion, engaging said second shift lever for axial support thereof and an axially elongated rotary bearing portion; and said second bearing means being concentrically mounted circumjacent said axially elongated rotary bearing portion of said first bearing means for rotary support thereon.

3. In a transmission shift control; support means; shift actuator means, mounted in said support means for rotary and axial movement to forward, reverse and neutral positions including a bearing portion; first bearing and shift lever means, surrounding and rotatably mounted on said bearing portion of said shift actuator means and axially supported by said support means; second bearing and shift lever means rotatably and axially supported only by said first bearing and shift lever means; and shift means carried by said first and second bearing and shift lever means and said shift actuator means for selectively interconnecting said shift actuator means to said first bearing and shift lever means and said second bearing and shift lever means when said shift actuator means is moved axially in said neutral position, and selectively rotating said first bearing and shift lever means when said shift actuator means is rotated to said forward and reverse positions.

4. The invention defined in claim 3 and said first bearing and shift lever means further including first and second bearing members, each having an inner bearing surface of substantial length engaging said bearing portion of said shift actuator means for rotatable support thereon, an outer bearing surface, spaced of each other, engaging said second bearing and shift lever means affording rotatable support therefor, and an end bearing surface engaging and axially supporting said second bearing and shift lever means.

5. The invention defined in claim 3 and said transmission shift control further including reverse lockout means having a stationary lockout washer abutting said first bearing means, a radially extending slot in said lockout washer, a pin secured to said shift actuator means movable therewith and alignable with said slot so that during movement of said shift actuator means from forward to reverse position, the pin must pass through said slot.

6. In a transmission shift control; support means; shift actuator means mounted in said support means for rotary and axial movement, including a control shaft and a key secured to said control shaft; first bearing means having an axial support surface abutting said support means, an inner bearing surface contacting said control shaft for rotatable support thereon, an outer bearing surface, and a slot opening opposite said axial support surface extending radially from said inner bearing surface being selectively engageable by said key; a first shift lever secured to said first bearing means, said first bearing means and said first shift lever being rotatable with said shift actuator means when said key is engaged with said slot; second bearing means having an axial support surface abutting said support means, an inner bearing surface contacting said control shaft for rotatable support thereon, an outer bearing surface, and a slot opening opposite said axial support surface extending radially from said inner bearing surface being selectively engageable by said key; a second shift lever secured to said second bearing means, said second bearing means, and said second shift lever being rotatable with said shift actuator means when said key is engaged with said slot; a third bearing means including a first inner bearing surface rotatably supported on said outer bearing surface of said first bearing means, a second inner bearing surface rotatably supported on said outer bearing surface of said second bearing means, and a third shift lever disposed between said first and second inner bearing surfaces and having annular axial bearing surfaces, disposed between and abutting said first and second bearing means opposite said axial support surfaces thereof, and a radial slot selectively engageable by said key, said third bearing means being rotatable with said shift actuator means when said key is engaged with said radial slot; whereby said third bearing means is rotatably and axially supported by said first and second bearing means.

7. The invention defined in claim 6 and said support means including reverse lockout means, for preventing simultaneous engagement of said key with said slot of said third shift lever and said slot of said second bearing means, including a washer having a central opening surrounding a portion of said control shaft and radial slot extending outward from said central opening; and a pin secured to said control shaft alignable with said radial slot whereby said pin may be moved through said slot when said control shaft is moved axially, said pin and said radial slot cooperating to prevent rotary movement of said control shaft when said pin is engaged in said radial slot.

8. The invention defined in claim 6 and said support means including a stationary frame member; a bracket, secured to said frame member, having an axial support portion at one end to axially support said first bearing means, and an elongated slot at another end; a guide member engaging the control shaft for rotary support thereof and abutting said second bearing means for axial support thereof; and fastener means extending through said elongated slot and engaging said guide member to secure said guide member to said bracket, whereby said guide member may be moved axially when said fastener means is loosened to permit axial location of said first and second bearing means and said guide member and said bracket maintain the axial location of said first and second bearing means when said fastener means is tightened.

References Cited

UNITED STATES PATENTS 2,317,654  4/1943  Wharam _____ 74—484
2,532,170  11/1950  Jovanovich et al. _____ 74—484

MILTON KAUFMAN, Primary Examiner

U.S. Cl. X.R.
74—476

PO-1050
(5/69)

UNITED STATES PATENT OFFICE
CERTIFICATE OF CORRECTION

Patent No. 3,490,308      Dated January 20, 1970

Inventor(s) Robert C. Keller and Larry K. Drake

It is certified that error appears in the above-identified patent and that said Letters Patent are hereby corrected as shown below:

In the specification, Column 2, line 28, after "shift" insert -- lever --; line 30, before "35" insert -- member -- and delete -- number --.

SIGNED AND
SEALED
JUN 23 1970

(SEAL)
Attest:

Edward M. Fletcher, Jr.
Attesting Officer

WILLIAM E. SCHUYLER, JR.
Commissioner of Patents